United States Patent
Sugiyama et al.

(10) Patent No.: US 6,258,149 B1
(45) Date of Patent: Jul. 10, 2001

(54) METHOD OF PRODUCING REDUCED IRON AGGLOMERATES

(75) Inventors: Takeshi Sugiyama, Osaka; Hidetoshi Tanaka, Kakogawa; Takao Harada, Kakogawa; Sumito Hashimoto, Kakogawa; Yoshimichi Takenaka, Kakogawa; Shoji Shirouchi, Kakogawa, all of (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 0 days.

(21) Appl. No.: 09/274,351

(22) Filed: Mar. 23, 1999

(30) Foreign Application Priority Data

Mar. 23, 1998 (JP) .................................................. 10-074443

(51) Int. Cl.[7] .................................................. C21B 13/08
(52) U.S. Cl. ............................................. 75/484; 266/177
(58) Field of Search ............................... 75/484; 266/177

(56) References Cited

U.S. PATENT DOCUMENTS

| | | |
|---|---|---|
| 3,443,931 | 5/1969 | Beggs et al. . |
| 3,635,456 | 1/1972 | Anthes et al. . |
| 3,776,533 | 12/1973 | Vlnaty . |
| 4,597,564 | 7/1986 | Hanewald et al. . |
| 4,622,905 | 11/1986 | MacDougall et al. . |
| 4,676,741 | 6/1987 | Pargeter . |
| 4,701,214 | 10/1987 | Kaneko et al. . |
| 5,186,741 | 2/1993 | Kotraba et al. . |
| 5,601,631 | 2/1997 | Rinker et al. . |
| 5,637,133 * | 6/1997 | Munnix et al. ................ 75/484 |
| 5,730,775 * | 3/1998 | Meissner et al. ................ 75/484 |
| 5,782,957 | 7/1998 | Rinker et al. . |

FOREIGN PATENT DOCUMENTS

| | | |
|---|---|---|
| 1 076 087 | 10/1954 | (FR) . |
| 1 246 308 | 9/1971 | (GB) . |
| 45-36092 | 11/1970 | (JP) . |
| WO 97/08347 | 3/1997 | (WO) . |

OTHER PUBLICATIONS

Frank N. Griscom, et al., Steel Times, vol. 222, No. 12, pp. 491–493, "The Fastmet Process Coal Based Direct Reduction for the EAF," Dec. 1994.

Richard H. Hanewald, et al., Iron and Steel Engineer, vol. 62, No. 3, pp. 62–67, "Recovery of Metals from Steel Wastes and Production of DRI by the Inmetco Process," Mar. 1985.

V. I. Lobanov, et al., Steel in the USSR, vol. 11, No. 10, pp. 561–563, "Determination of Optimal Parameters of Reduction Firing of Iron Ore Pellets," Oct. 1981.

* cited by examiner

Primary Examiner—Melvyn Andrews
(74) Attorney, Agent, or Firm—Oblon, Spivak, McClelland, Maier & Neustadt, P.C.

(57) ABSTRACT

A method of producing reduced iron agglomerates capable of preventing oxidation in the surface layer of the agglomerates and obtaining reduced iron agglomerates having a high degree of metallization, by blowing a methane or methane-containing gas to the reduced iron oxide agglomerates incorporated with carbonaceous material at a surface temperature of 1150° C. or higher during movement in a moving hearth heating type furnace at the end of reduction as the final stage of the stagnation period of the agglomerates in the heating furnace.

16 Claims, 9 Drawing Sheets

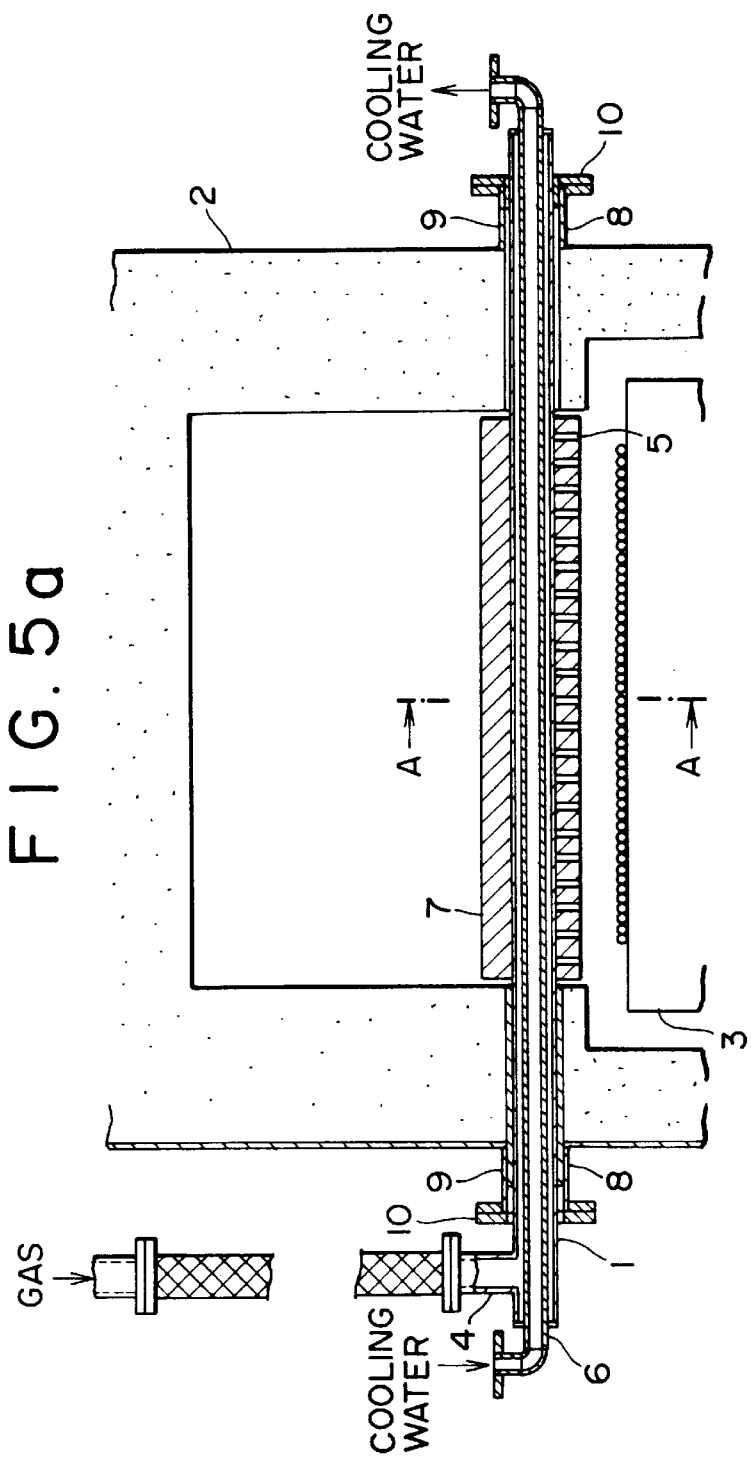
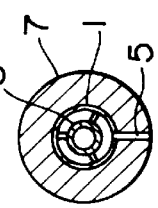

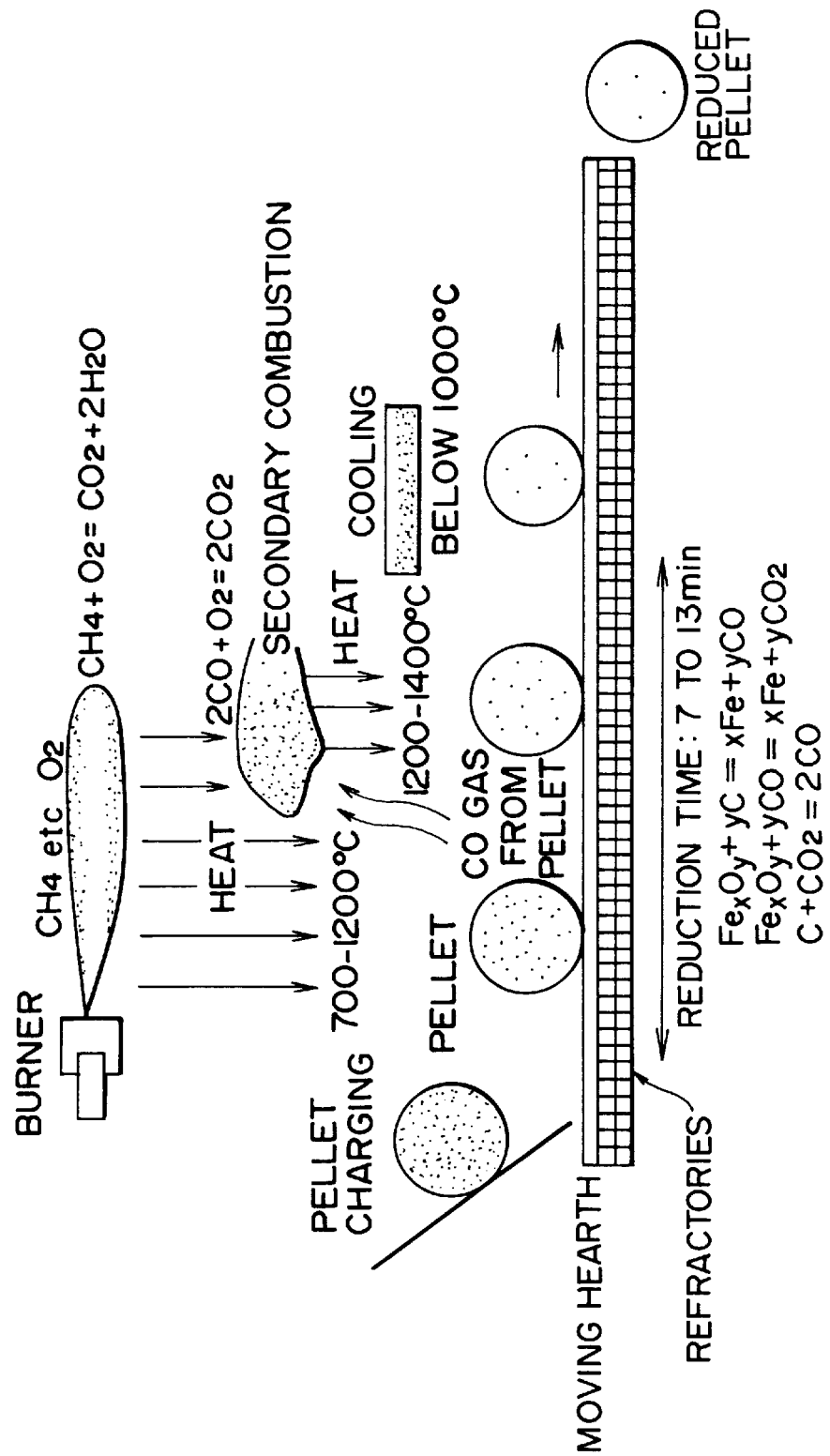

METHOD OF PRODUCING REDUCED IRON AGGLOMERATES

BACKGROUND OF THE INVENTION

1. Field of the Invention

The present invention concerns a method of producing reduced iron agglomerates by reducing iron oxide agglomerates incorporated with carbonaceous material.

2. Description of the Background

The MIDREX method is well-known as a method of producing reduced iron. In the MIDREX method, a reducing gas produced from natural gas is fed through a tuyere into a shaft furnace and allowed to rise therein for reduction of iron ores or iron oxide pellets charged therein, to thereby produce reduced iron. However, since the method required a supply, as a fuel, of a large amount of high-cost natural gas, the location of a plant utilizing the MIDREX method is limited to a region producing natural gas.

In recent years, a certain type of method for producing reduced iron has become of interest, in which relatively inexpensive coal can be used instead of natural gas as a reducing agent. An example of a method of producing reduced iron is disclosed in U.S. Pat. No. 3,443,931, which is hereby fully incorporated by reference. In this prior art technique, a mixture of powdery of iron ore and carbonaceous material is pelletized and, then reduced in a high-temperature atmosphere in a rotary hearth furnace with a flat annular hearth to thereby produce reduced iron. This method has advantages in that coal can be used as a reducing agent, a powder of iron ore can be used directly, reduction can be performed at a high rate and the carbon content of products can be regulated. Since the pellet temperature at the end of reduction is in the order as high as 1300° C., it is necessary to lower the temperature of the reduced pellet below 1000° C. in the reducing furnace for easy handling in order to fabricate the reduced pellets into final products such as hot briquettes. For this purpose, U.S. patent described above proposes a method of disposing a cooling zone at the final end in the reducing furnace, and cooling by radiation the reduced pellets at high temperature to lower than 1000° C. by using a water cooling panel or the like. In this method, a pellet incorporated with carbonaceous material is heated and iron oxide is reduced by CO gas liberated from the incorporated carbonaceous material. Therefore, reduction proceeds at the inside of the pellet and the iron oxide is metallized with no substantial effect of a combustion gas atmosphere.

However, referring to cooling of the pellet after reduction, the method of disposing the cooling zone at the end of the reducing furnace as described in this U.S. patent involves a problem that the effective hearth area for reduction is decreased by so much as the cooling panel is disposed in the cooling zone, to lower the productivity of the reducing furnace.

Further, the method also involves a problem that the surface layer of the pellet is not reduced if the combustion gas atmosphere is oxidative, so that the surface layer for 0.5 to 1.0 mm area is left as the iron oxide and the degree of metallization remains in the order of 80%. As a countermeasure, in the method described in the U.S. Pat. No. 3,443,931, inside of the furnace is divided into three heating stages, a heating temperature is defined for each of the heating stages and the volume percentage of burnable components ($H_2$+CO) in the atmosphere is controlled along with the progress of reduction, thereby promoting the reduction at the surface layer of the pellet and increasing the degree of metallization of reduced iron. However, the degree of metallization is not yet satisfactory.

It is considered that not only the volume percentage of the burnable component but also the ratio thereof with the oxidative gas, that is, degree of reduction are important in order to increase the degree of metallization, so that improvement for the degree of metallization can not be expected only by defining the volume percentage of the burnable components if the kind of the fuels differs. Further, the method of controlling the degree of reduction of the atmospheric gas involves a problem in that it requires change of the composition of the great amount of gas in the entire combustion chamber and, accordingly, gives a negative effect of lowering the combustion efficiency to require a pellet retention time of more than as three minutes in the atmosphere control zone.

Further, Japanese Patent Publication Sho 45-36092 which is hereby fully incorporated by reference discloses a method of producing metallized pellets by the steps of mixing powdery iron ore, powdery carbonaceous material such as powdery coal and powdery flux such as limestone, together with a predetermined flux so as to form an intimate powdery mixture, pelletizing them into individual spheres and drying the mixture in a sufficiently inert atmosphere on a moving grate type machine. The patent describes that the content of gaseous materials used for preventing re-oxidation of once reduced metallic iron has to be kept to less than a predetermined limit and, specifically, that a non-reactive gas with the oxygen content below 15% by weight is used.

However, when the temperature at the center of the pellet exceeds 1000° C., solution loss reaction; $C+CO_2 \rightarrow 2CO$ becomes vigorous and a great amount of CO rich gas evolves from the inside of the pellet, so that reduction proceeds with no substantial effect of the combustion gas atmosphere and iron oxide is metallized. However, since iron oxide is left as it is or metallic iron is re-oxidized by the combustion gas in the surface layer of the pellet for a 0.5–1.0 mm region at the final stage of the reduction, there is a problem that the degree of metallization remains only in the order of 80%.

SUMMARY OF THE INVENTION

An object of the present invention is to provide a method for producing reduced iron agglomerates of obtaining reduced iron agglomerates having a high degree of metallization from iron oxide agglomerates incorporated with carbonaceous material.

A method of producing reduced iron agglomerates in a preferred embodiment according to the present invention includes a step of charging iron oxide agglomerates incorporated with carbonaceous material on a moving hearth of a moving hearth furnace and reducing the iron oxide agglomerates incorporated with carbonaceous material, wherein a methane or methane-containing gas is blown to the surface of the agglomerates at a surface temperature of 1150° C. or higher for at least final $1/18-1/3$ period of a retention time of the agglomerates in the furnace.

In this method, reduced iron pellets having a high degree of metallization of 90% or more can be produced.

Further, it is preferred that the methane or methane-containing gas is blown for at least final $1/18-1/9$ period of the retention time of the agglomerates in the furnace, when the degree of reduction after mixing and decomposition of the methane or methane-containing gas to be blown on the surface of the iron oxide agglomerates incorporated with the carbonaceous material and a combustion gas in the furnace

[(CO+$H_2$)/(CO+$H_2$+$CO_2$+$H_2O$)] is 0.7 or more, or the methane or methane-containing gas is blown for at least final 1/18–1/3 period of the retention time of the agglomerates in the furnace, when the degree of reduction is 0.55 or more.

In this embodiment, the degree of metallization of the reduced iron pellets can be improved further.

Furthermore, when only the methane or methane-containing gas is blown to the surface of the iron oxide agglomerates incorporated with carbonaceous material, it is preferred that the methane or methane-containing gas is blown for at least final 1/9 period of the entire retention time in the furnace.

In this embodiment, if a cover such as a shield with a length corresponding to the moving distance of the reduced iron agglomerates within the 1/9 period of the entire retention time is disposed in the furnace so as to cover the reduced iron agglomerates and the methane or methane-containing gas is blown in the cover, mixing between the combustion gas in the heating furnace and the methane or methane-containing gas can be avoided, by which re-oxidation of the reduced iron agglomerates can be prevented to further improve the degree of metallization of the reduced iron agglomerates.

Further, it is preferred that the methane or methane-containing gas is blown in an amount of less than 6.0 kgmol per ton of the reduced iron agglomerates to the surface of the reduced iron agglomerates after the completion of the reduction for the iron oxide agglomerates incorporated with carbonaceous material.

In this case, the methane or methane-containing gas blown to the surface of the reduced iron agglomerates decomposes into $H_2$ and CO at high temperature of 1100° C. or higher, and the reduced iron agglomerates can be cooled while preventing oxidation by the decomposing reaction.

Further, it is preferred that the reduced iron agglomerates reduced in the moving hearth furnace are discharged out of the furnace, the reduced iron agglomerates discharged from the furnace are stored in a reservoir and the methane or methane-containing gas is blown into the reservoir in a state where the surface temperature of the agglomerates is at 850° C. or higher.

In this case, the blown methane or methane-containing gas can promote reduction at the surface layer of the agglomerates and prevent re-oxidation at the surface layer of the pellets at high temperature.

Further, the exhaust gas from the reservoir is preferably utilized as a fuel or as a methane or methane-containing gas to be blown on the surface of the iron oxide agglomerates incorporated with the carbonaceous material as the reducing gas.

In this case, the exhaust gas recovered from the reservoir can be utilized effectively as the fuel or as the methane or methane-containing gas to be blown on the surface of the iron oxide agglomerates incorporated with carbonaceous material in the final stage of reduction. Further, this can recover sensible heat of the reduced iron agglomerates in the reservoir and utilize the same for the heating of the iron oxide agglomerates incorporated with carbonaceous material, to improve the efficiency.

BRIEF DESCRIPTION OF THE DRAWINGS

FIG. 5a is a vertical cross sectional of view an example of a gas blowing device used in a reducing zone and a cooling zone;

FIG. 5b is a view taken along line A—A in FIG. 5a:

FIG. 11 is an explanatory view for a method of producing reduced iron agglomerates by reducing iron oxide agglomerates incorporated with carbonaceous material by using a moving hearth furnace.

DESCRIPTION OF THE PREFERRED EMBODIMENTS

Figure 1:
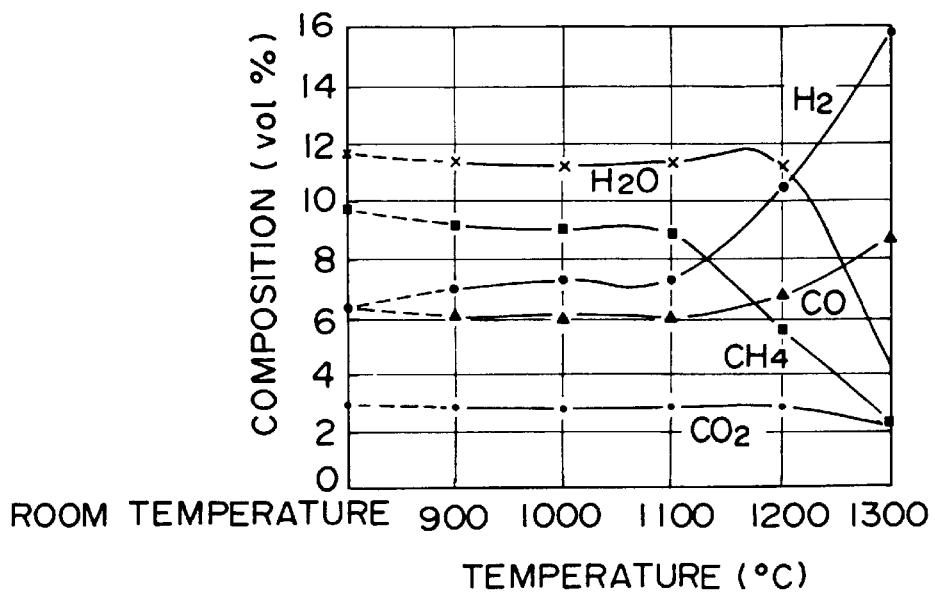
FIG. 1 is a graph illustrating a relationship between decomposition of methane and heating temperature when methane is present by 10% by volume in an incomplete combustion gas.

Method of producing reduced iron agglomerates in a preferred embodiment of the present invention will be explained. While explanation is made for agglomerates in the form of pellet, the invention is not restricted to the form of the agglomerate.

A green material mixture in this embodiment comprises iron oxide, as a main ingredient, and contains a carbonaceous material in an amount sufficient to reduce the iron oxide and a binder such as an organic binder in an amount sufficient to bind the iron oxide and the carbonaceous material.

The iron oxide as the main ingredient of the green material mixture includes powdery iron ore or mill scale. Blast furnace dust, converter dust, dust from sintering process and electric furnace dust and mixtures thereof can also be used. Since the dusts mentioned above contain a carbon ingredient, addition of carbonaceous material is not required or addition amount can be decreased.

The carbonaceous material in this embodiment is a reducing agent necessary for reducing the iron oxide contained in iron oxide pellets in the reducing furnace. Accordingly, there is no particular restriction on the material of the carbonaceous material so long as the material contains carbon. Examples of the carbonaceous material used in this embodiment can include coal, coke, charcoal and carbon-containing blast furnace dust. The carbonaceous material may be added in an amount sufficient to reduce the iron oxide, and the amount added actually may vary depending on the content of the iron oxide in the iron oxide pellet, content of fixed carbon in the carbonaceous material, aimed quality of the reduced iron pellet such as the degree of metallization or degree of residual carbon after reduction. The content generally ranges from 10 to 30 mass %. If the addition amount of the carbonaceous material is less than 10 mass %, it is insufficient as the reducing agent. On the contrary, if the addition amount of the carbonaceous material exceeds 30 mass %, the strength of the iron oxide pellet after drying is lower and the amount of the carbonaceous material is excessive which is not preferred with an economical view point as well.

The iron oxide agglomerates incorporated with carbonaceous material having the constitution described above is reduced as below. As shown in FIG. 11, iron oxide pellets incorporated with carbonaceous material as the iron oxide agglomerates each of 12 to 24 mm diameter incorporated with carbonaceous material dried at a temperature of 140 to 150° C. are charged on a moving hearth of a moving hearth type tunnel heating furnace. The pellets thus charged are heated along with the movement on the moving hearth to about 1350° C. at the highest by radiant heat of a combustion gas in the furnace. Meanwhile, the iron oxide in the pellets is reduced directly or indirectly by the incorporated carbonaceous material to complete reduction for 7 to 13 min. The reduced iron oxide pellets incorporated with carbonaceous material form reduced iron pellets, which are cooled in the furnace to a temperature of 1000° C. or lower, discharged out of the furnace and then classified into those charged directly into a melting furnace, those stored temporarily in a reservoir to form final products as such or those fabricated into briquettes.

When the temperature at the center of the iron oxide pellet incorporated with carbonaceous material reaches 1000° C. or higher, a solution loss reaction: $C+CO_2 \rightarrow 2CO$ becomes vigorous and a CO rich gas is liberated in a great amount from the inside of the pellets, so that reduction proceeds at the inside of the pellets with no substantial effect of the combustion gas atmosphere and iron oxide is metallized. However, since the surface layer of the pellets for a 0.5 to 1.0 mm region remains as it is as the iron oxide or metallic iron is re-oxidized by the combustion gas at the final stage of the reduction, the degree of metallization remains only at the order of 80%. In view of the above, for reliably attaining a high degree of metallization at the final stage of the reduction, a present invention adopts a method of blowing a highly reducing gas to the surface of the iron oxide pellets incorporated with carbonaceous material that is left as it is in the form of iron oxide.

Specifically, a methane or methane-containing gas is blown to the surface of the pellets at least for final $1/18$ to $1/3$ period of the retention time of the pellets in the heating furnace when the surface temperature of the iron oxide pellets incorporated with carbonaceous material on the moving hearth of the heating furnace is at 1150° C. or higher. Thus, the methane or methane-containing gas decomposing non-catalytically at a temperature of 1100° C. or higher is decomposed and reformed under the presence of a combustion gas and an exhaust gas formed by reduction in the heating furnace as: $CH_4+H_2O \rightarrow CO+3H_2$ or $CH_4+CO_2 \rightarrow 2CO+2H_2$, and reduces the iron oxide remained unreduced on the pellet surface into a metallized state. In this method, the methane or methane-containing gas may be blown to the pellet surface only for a moving range of the pellets on the moving hearth at least for the final $1/18$ to $1/3$ period of the retention time of the pellets in the heating furnace. Further, as shown in FIG. 1, since the decomposing and reforming of the methane or methane-containing gas becomes vigorous at 1200° C. or higher, if the catalyst is not present together, blowing is preferably conducted at the surface temperature of 1200° C. or higher, by which the degree of metallization can be improved further. As the methane-containing gas in this embodiment, gases containing methane by more than 5% by volume such as a natural gas or coke furnace gas can be utilized. FIG. 1 is a graph illustrating a relationship between the methane decomposition and the heating temperature in a case where methane is present by 10% by volume in an incomplete combustion gas.

The retention time in the heating furnace means a period of time from the charge of the iron oxide pellets incorporated with the carbonaceous material into the heating furnace to the discharge of them out of the furnace.

Referring to the blowing time of the methane or methane-containing gas, at least final $1/18$ to $1/9$ period of the retention time of the pellets in the heating furnace is required when the degree of reduction: $[(CO+H_2)/(CO+H_2+CO_2+H_2O)]$ is 0.7 or more. When the degree of reduction is 0.55 or more, at least final $1/18$ to $1/3$ period of the retention time of the pellets in the heating furnace is necessary. This is because the blowing time of the methane or methane-containing gas is determined depending on the degree of reduction: $[(CO+H_2)/(CO+H_2+CO_2+H_2O)]$ when a gas mixture comprising the blown gas and the combustion gas is blown to the surface of the agglomerates and it has to be blown for a shorter period of time at a higher degree of reduction and for a longer period of time at a lower degree of reduction.

Figure 2:
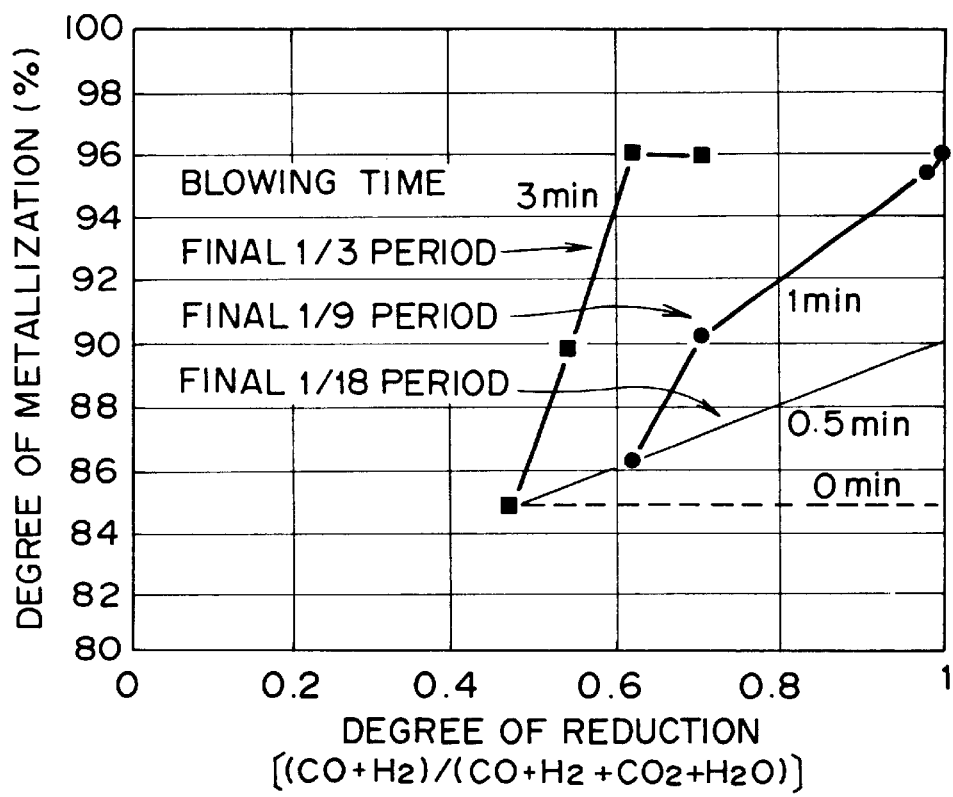
FIG. 2 is a graph illustrating a relationship between the degree of reduction and a methane blowing time that gives an effect on the degree of metallization at an atmospheric temperature of 1300° C. the methane decomposition ratio being calculated as 77%.

Then, the reason for setting the period of blowing the methane or methane-containing gas is to be explained. FIG. 2 is a graph illustrating a relationship between the degree of reduction and the methane gas blowing period that gives an effect on the degree of metallization, with the methane decomposition ratio being calculated as 77% at the atmospheric temperature of 1300° C. in the furnace. As shown in FIG. 2, in order to increase the degree of metallization to 90% or higher, it is necessary to blow the methane or methane-containing gas for at least final $1/3$ period of the entire retention time in the furnace at the degree of reduction of 0.55, for at least final $1/9$ period of the entire retention time in the furnace at the degree of reduction of 0.7 and for at least final $1/18$ period of the entire retention time in the furnace at the reduction degree of 1.

The degree of reduction may be measured by measuring the degree of reduction at a position near the pellet surface, for example, by gas chromatography. It is preferred that the blowing range is controlled based on the degree of reduction and the pellet moving speed and mixing with the combustion gas is decreased to increase the degree of reduction. For effectively utilzing the blowing gas it is suitable to apply blowing at a position lower than the burner and at a position near the pellet surface, so as to cover the surface of the pellets.

Figure 3:
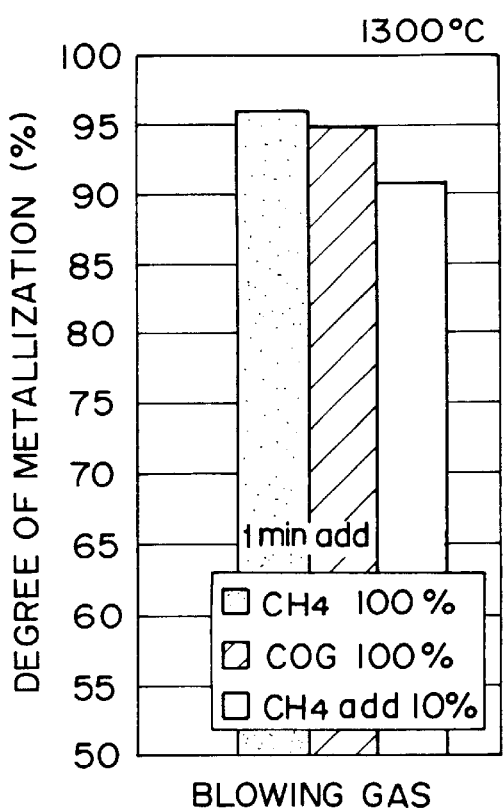
FIG. 3 is a graph illustrating the degree of metallization when 100% methane, 100% coke furnace gas or a gas mixture of the furnace gas and 10% methane is blown each for one minute to the surface of reduced iron agglomerate at 1300° C.

Further, reduction at the surface layer of the pellets can be promoted by blowing only the methane or methane-containing gas to the surface of the reduced iron pellets for at least $1/9$ period of the entire retention time in the furnace during movement while avoiding mixture with the combustion gas. The reason why only the methane or methane-containing gas is blown to the surface of the reduced iron pellets for the final 1/5 period of the entire retention time in the furnace is that the degree of metallization is improved by 5% or more by blowing a 100% methane or 100% coke furnace gas to the surface of the reduced iron pellets at 1300° C. for at least final 1/5 period of the entire retention time in the furnace, than by blowing a gas mixed with 10% methane for the final 1/5 period in the same manner as shown in FIG. 3. In this case, in order to avoid mixing with the combustion gas, it is preferred, that the gas is blown by disposing a cover such as a shield at the final end of the furnace for discharging the reduced iron pellets so as to cover the reduced iron pellets in the furnace, the shield having a length corresponding to a distance along which the reduced iron pellets move within the 1/5 period of the entire retention time in the entire furnace and blowing only the methane or methane-containing gas in the cover. The coke furnace gas in FIG. 3 mainly comprises 28 vol % $CH_4$, 60 vol % $H_2$, 6 vol % CO, 2 vol % $CO_2$ and 4 vol % $N_2$.

Further, the reduced iron pellets are cooled after reduction by blowing the methane or methane-containing gas of less than 6.0 kgmol or less per tone of the reduced iron pellets to the surface of the reduced iron pellets during movement in the cooling zone for 1/5 period of the entire retention time in the furnace at the longest. The methane or methane-containing gas blown to the surface of the reduced iron pellets is decomposed into $H_2$ and CO at a high temperature of 1100° C. or higher. Since the decomposing reaction is endothermic, it deprives a great amount of heat from the surroundings. Accordingly, the reduced iron pellets can be cooled by blowing the methane or methane-containing gas on the surface of the reduced iron pellets at high temperature. The blowing amount of the methane or methane-containing gas is less than 6.0 kgmol per ton of the reduced iron pellets, and the blowing period is 1/5 of the entire retention time in the furnace at the longest. This is because cooling proceeds excessively and temperature necessary for the succeeding step can not be ensured if the blowing amount exceeds 6.0 kgmol and the blowing period exceeds 1/5 of the entire retention time in the furnace. Further, if a long cooling zone can be disposed in view of the facility, since the reduced iron pellets can be cooled even by spontaneous cooling by radiation, it is possible to control the blowing amount of the methane or methane-containing gas within a range of less than 6.0 kgmol per ton of the reduced iron pellets and the blowing period within a range of 1/5 period of the entire retention time in the furnace at the longest, respectively, depending on the required cooling temperature.

The amount of the blowing gas per ton of the reduced iron pellets means the total weight of the reduced iron derived by calculation on the assumption that the iron oxide in the pellets is reduced by 90%, on the basis of the total weight of the iron oxide pellets incorporated with carbonaceous material to be charged into the heating furnace.

Then, explanation is to be made for a gas blowing device for blowing a gas into a reducing furnace in the method of producing reduced iron pellets according to preferred embodiments of the present invention.

An example of a gas blowing device used for the reducing zone and the cooling zone is shown in FIG. 5a and FIG. 5b. FIG. 5a is longitudinal cross sectional view of a gas blowing device and FIG. 5b is a view taken along line A—A in FIG. 5a. As shown in FIG. 5a and FIG. 5b, a header 1 is a metal pipe made of carbon steel or stainless steel and is disposed horizontally above a moving hearth 3 while passing through both side walls of a reducing furnace 2. The header 1 is dosed at one end with a blind plate and connected at the other end with a gas supply pipe 4. A plurality of round hole or slit-shaped nozzles 5 for blowing gas are disposed to a portion of the header 1 situated in the reducing furnace. FIG. 5b shows an example of a round hole nozzle.

A water cooling pipe 6 is disposed passing through the header 1 along the center line of the header, and the header and the water cooling pipe are seal-welded at both ends of the header. Cooling water is supplied axially from one end and discharged from the other end of the water cooling pipe 6. The header is cooled by radiation from the surface of the water cooling pipe cooled by the cooling water.

Further, the surface of the header 1 is covered with refractory 7 for a range exposed in the reducing furnace in order to shield radiation heat in the reducing furnace. Blowing holes perforating from the surface of the header to the surface of the refractory are disposed for a nozzle portion each in the same size as that for the circular hole or slit. For the application of the refractory 7, nozzle-shaped members each having the same size as that of the circular hole or slit and the same height as the thickness of the refractory are preferably disposed at the nozzle position for facilitating the application work. When this header is disposed in the cooling zone, the water cooling pipe and the refractory can be saved since the atmospheric temperature in the reducing furnace is low.

The blowing gas is introduced from the gas supply pipe 4 into the header 1, passed between the header 1 and the water cooling pipe 6, caused to flow axially of the header 1 and then blown from the nozzle 5 into the reducing furnace 2. It is important that the header has a sufficiently large capacity such that a gas is blown as a uniform flow from the nozzle. In this regard, the basic structure is identical with usual headers generally used industrially.

The header 1 is supported by support pipes 8 disposed on outer walls on both sides of the reducing furnace 2. A gland packing 9 is interposed between the header 1 and the support pipe 8 and pressed by a packing retainer 10 to secure the header 1 to the support pipe 8 and seal the inside and the outside of the reducing furnace 2. When the ground packing 9 pressed by the packing retainer 10 is slackened, the header 1 is rotatable, and a gas blowing angle from the nozzle can be changed.

Figure 6:
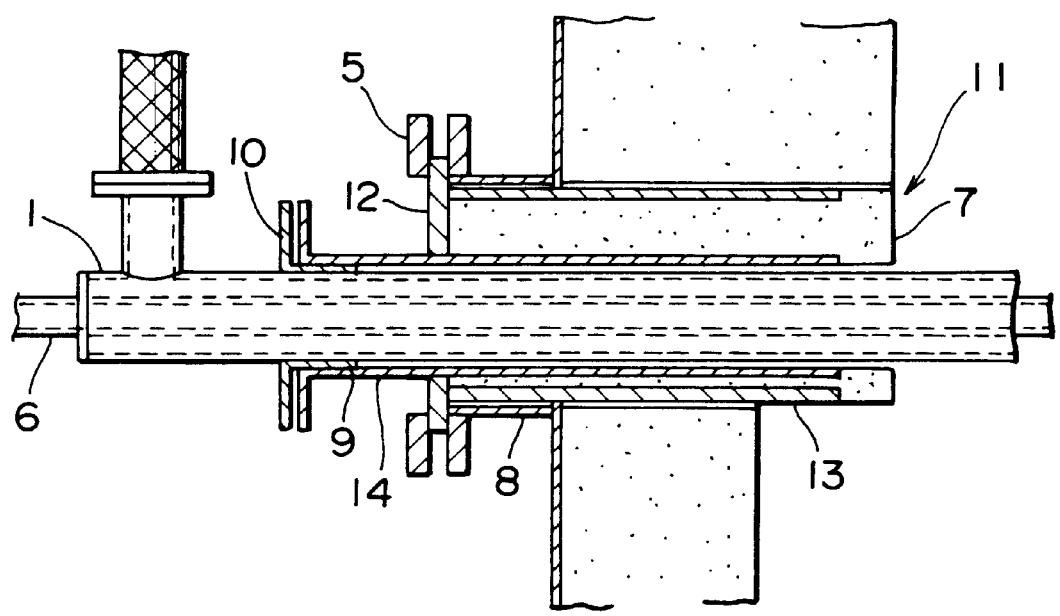
FIG. 6 is a view showing an example of a header supporting device having a mechanism for changing the height of a header.

When the vertical position (height) of the header is changed, a header support device having a height changing mechanism as shown, for example, in FIG. 6 is used. FIG. 6 is a vertical cross sectional view of the header support device. An eccentric boss 11 for changing the height of the header comprises a flange plate 12, a guide pipe 13 and a header insertion pipe 14. The header insertion pipe 14 is attached at a position displaced by one-half of the required height controlling region from the center of the flange plate 12, and the guide pipe 13 having an outer diameter smaller than the inner diameter of the support pipe 8 is attached to the flange plate 12 such that the center of the guide pipe 13 is aligned with the center of the flange plate 12.

The eccentric boss 11 is fitted to the support pipe 8 by inserting the guide pipe 13 of the eccentric boss into the pipe 8 and a through hole of the reducing wall furnace perforated at an diameter equal with the support pipe 8 and secured by clamping the flange plate 12 of the eccentric boss 11 with bolts and nuts to the support pipe 8 by using the loose flange 15. The header 1 is secured to the header insertion pipe 14 of the eccentric boss 11 by pressing the gland packing 9 inserted between the header 1 and the header insertion pipe 14 of the eccentric boss 11 by the packing retainer 10 and also seals the inside and the outside of the reducing furnace. The height of the header 1 can be changed by loosing the loose flange 15 and rotating the eccentric boss 11. The side of the eccentric boss 11 on the reducing furnace surrounded with the flange plate 12, the guide pipe 13 and the header insertion pipe 14 is applied with refractory for preventing deformation and deterioration of them due to high temperature.

When the gas blowing device is disposed in the cooling zone of the reducing furnace, since the atmospheric temperature is lower in the cooling zone than in the reducing zone as described previously, the surface is not necessarily be covered with the refractory in view of the strength of the header. Cooling by the cooling pipe is not necessary also with the same reason. However, for increasing the cooling effect of the reduced iron pellets, the surface temperature of the header is lowered and the radiation cooling from the surface of the reduced pellets can be promoted by adopting a cooling structure using cooling medium.

Figure 7:
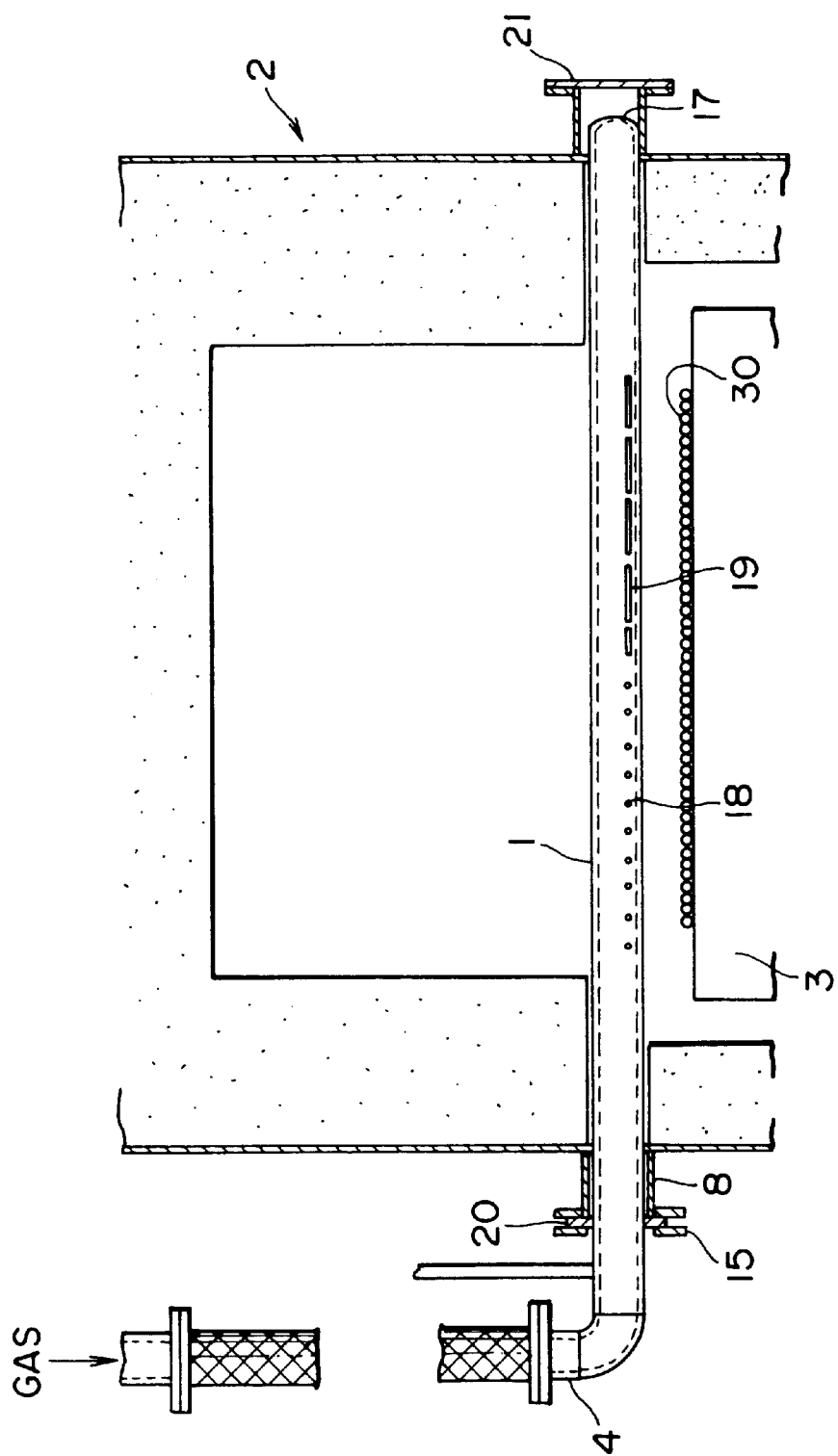
FIG. 7 is a view showing an example of a gas blowing device disposed in a cooling zone of the same type as that disposed in the reduced zone.

FIG. 7 shows an example of a gas blowing device, disposed in the cooling zone, of the same structure as that disposed in the reducing zone. As shown in FIG. 7, a header 1 comprises a metal pipe made of carbon steel or stainless steel and is disposed horizontally above a moving hearth 3 that penetrates both side walls of the reducing furnace 2 and carries agglomerates 30 thereon. The header 1 is dosed at the top end with a cap 17 and connected at the other end with a gas supply pipe 4. A plurality of round hole nozzles 18 or slit nozzles 19 are disposed for blowing a gas at a portion of the header 1 situated in the reducing furnace. Further, a securing ring 20 is disposed to the header 1 on the side of a gas supply pipe 4 for securing the header 1 to support pipe 8. The blowing gas is introduced from the gas supply pipe 4 into the header 1, caused to flow axially in the header 1 and then blown from the nozzle 5 into the reducing furnace. It is important that the header 1 has a sufficiently large capacity so that the gas can be blown as a uniform stream from the nozzles. In this regard, the basic structure is identical with usual headers generally used industrially.

The header 1 is supported by support pipes 8 disposed to the outer walls on both sides of the reducing furnace, and secured on the support pipes 8 by putting a securing ring 20 of the header 1 by the loose flange 15 into the flange of the support pipe 8, and seals the inside and the outside of the reducing furnace. The support pipe 8 is dosed on the top end of the header 1 by a blind flange 21. A gap is present between the top end of the header 1 and the blind flange 21 and can absorb elongation of the header due to thermal expansion. Further, the header 1 is made rotatable by slackening the loose flange 15, and a gas blowing angle from the nozzle of the header can be changed. Further, the height of the header 1 can also be changed by combination with the height changing mechanism (eccentric boss) shown in FIG. 6.

Figure 8:
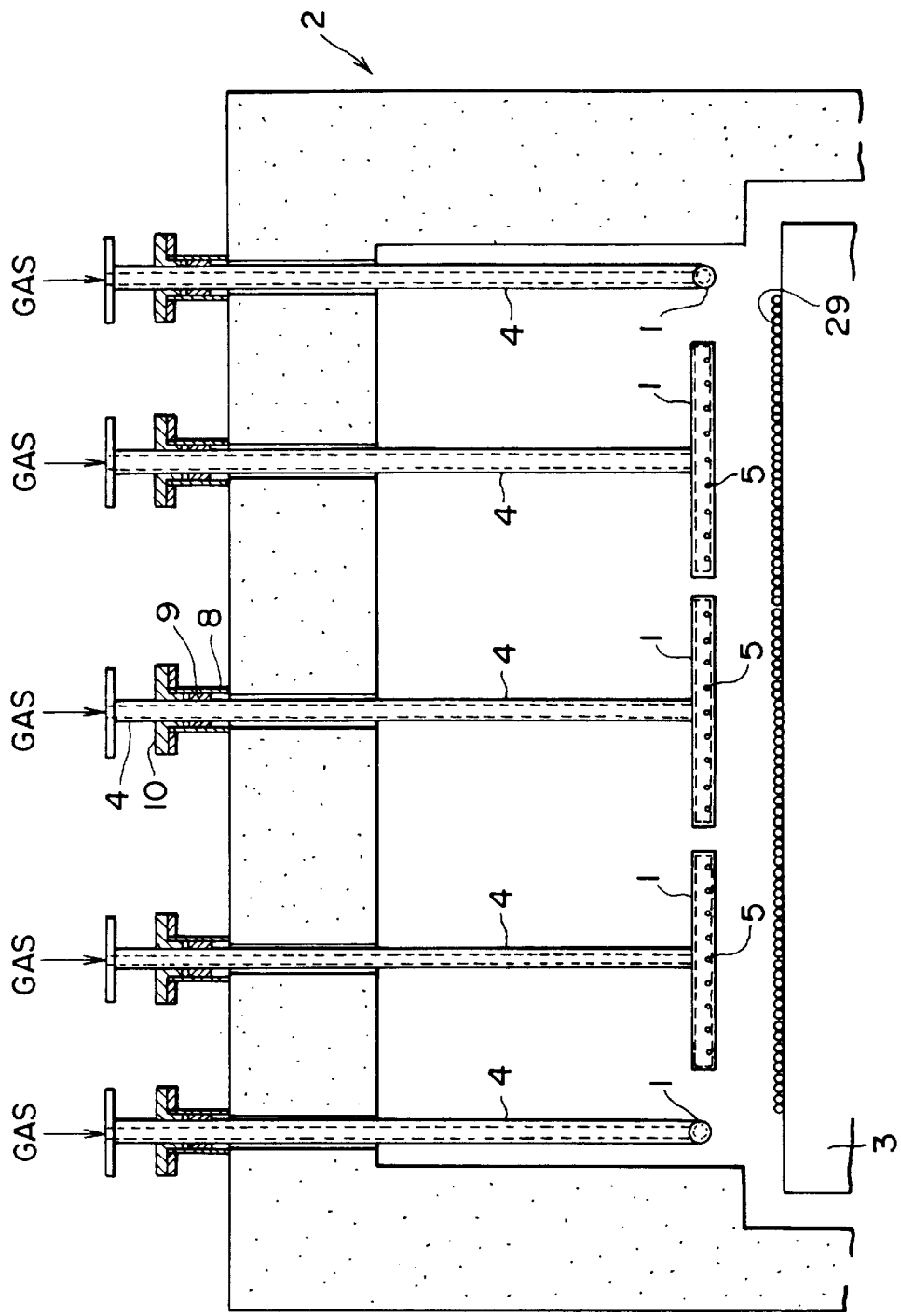
FIG. 8 is a view showing another example of the gas blowing device disposed in the cooling zone.

FIG. 8 shows another example of the gas blowing device disposed in the cooling zone. In the gas blowing device shown in FIG. 8, a plurality of gas supply pipes 4 are vertically disposed so as to change the vertical position to a plurality of through holes formed in the ceiling of the cooling zone of the reducing furnace, and a header 1 made of metal such as carbon steel or stainless steel is disposed to the top end of each of a plurality of gas supply pipes 4 disposed in a horizontal direction (inverted T-shape). In the drawings, are shown a moving hearth 3 and pellets 29 charged on the moving hearth. The header 1 is closed on both ends by a side plate or a cap and has a plurality of gas blowing nozzles 5 formed at the lower surface of the header. The gas supply pipe 4 is led to the outside of the reducing furnace by way of a through hole disposed to the ceiling of the reducing furnace and the support pipe 8 attached coaxially with the through hole. A gland packing 9 is interposed between the support pipe 8 and the gas supply pipe 4 and the gland packing 9 is urged by a packing retainer 10 to secure the gas supply pipe 4 to the support pipe 8 and seal the inside and the outside of the reducing furnace. When the packing retainer 10 is slackened, vertical position of the gas supply pipe 4 can be changed and, accordingly, the height of the header can be changed. The blowing gas is introduced from the gas supply pipe 4 into the header 1, caused to flow axially in the header 1 and then blown from the nozzle 5 to the reducing furnace. In this regard, the basic structure is identical with usual headers generally used industrially.

When a plurality of the gas blowing devices shown above are disposed in the lateral direction of the reducing furnace, since the amount of the blowing gas can be controlled independently on individual headers, this device is effective in a case where the amount of the blowing gas has to be controlled depending on the blowing locations.

Figure 9A:
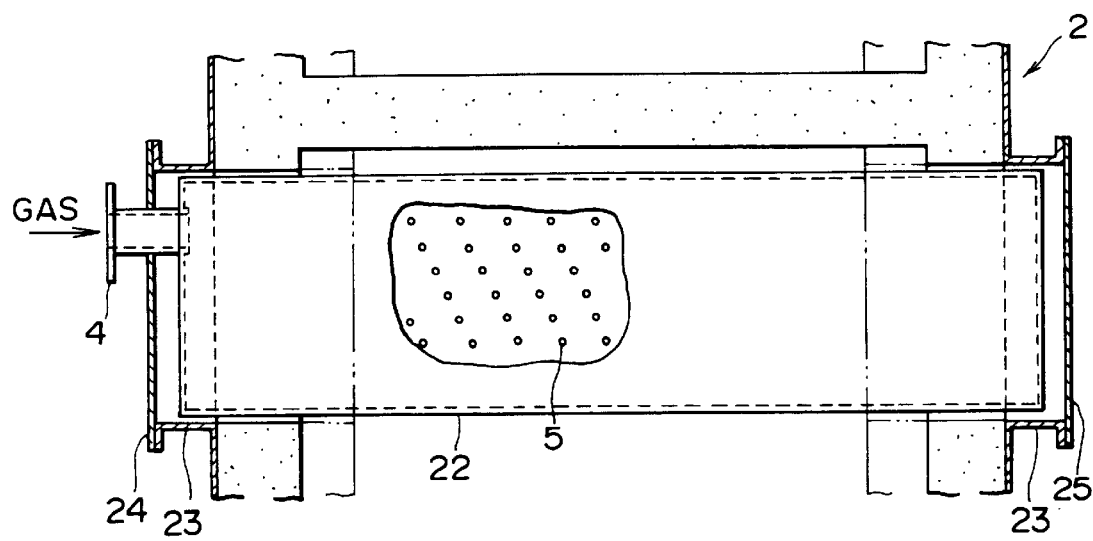
FIG. 9a is a plan view showing another example of the gas blowing device having a box-header disposed in the cooling zone.
Figure 9B:
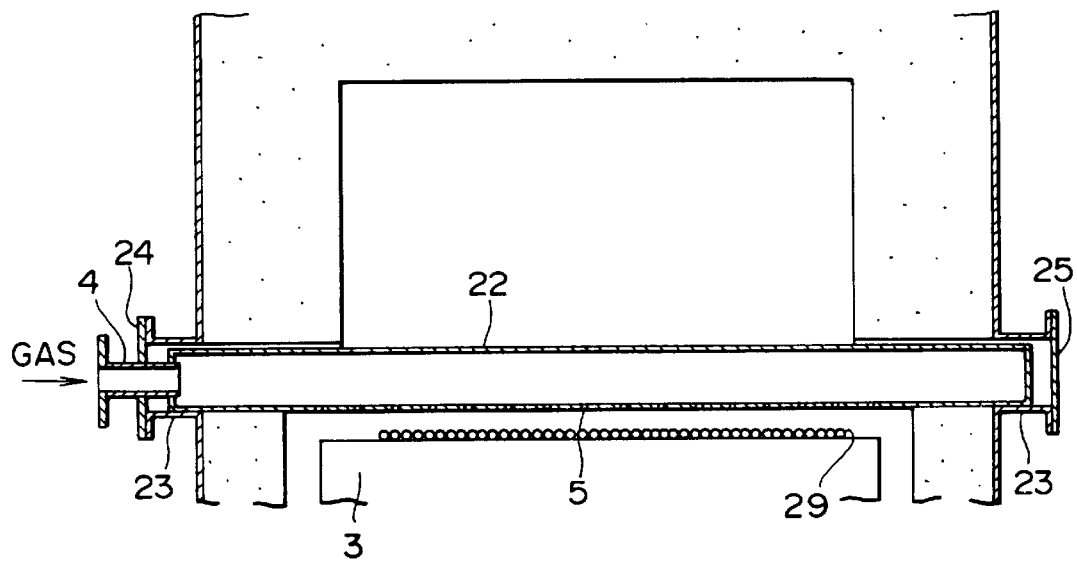
FIG. 9b is a front elevational view of the gas blowing device having a box-type header disposed in the cooling zone.

If it is intended to ensure a wider range for gas blowing, a box type header of a rectangular cross section is effective. FIG. 9a and FIG. 9b show one example of a gas blowing device having a box type header of a rectangular cross section disposed in a cooling zone. FIG. 9a is a plan view and FIG. 9b is a front elevational view. A box type header 22 made of metal such as carbon steel or stainless steel is disposed passing through both side walls of a reducing furnace 2 and supported by rectangular support pipes 23 disposed to the outer surface on both side walls of the reducing furnace 2. A plurality of circular hole nozzles 5 are formed to the lower surface of the box type header 22. In the box type header 22, since a number of nozzles 5 can be provided in a plurality of rows for a certain width at the lower surface of the header 22, a wide gas blowing range can be ensured.

Further, a gas supply pipe 4 is connected to one end of the box type header 22. A flange 24 disposed to the gas supply pipe 4 and a flange of the rectangular support pipe 23 are damped and fixed by bolts and a nuts, to secure the box type header 22 to a rectangular support pipe 23 and seal the inside and the outside of the reducing furnace. The end of the rectangular support pipe 23 situated at the counter gas supply side is blocked with a rectangular blind flange 25. A gap capable of absorbing elongation of the box type header 22 by heat expansion is present between the top end of the box-type header 22 and the rectangular blind flange 25 and the blowing gas is introduced from the gas supply pipe 4 into the box type header 22 and blown from the nozzle 5 into the reducing furnace.

Refractory partition walls are often provided between the reducing zone and the cooling zone in the reducing furnace for shielding the radiation heat in the furnace. The gas blowing devices provided in the reducing zone and/or cooling zone can serve also as the partition wall for interrupting the radiation heat. Particularly, the box type header has a significant effect of shielding the radiation heat. The number of headers disposed in the reducing furnace is determined depending on the moving speed of the pellets on the moving hearth and the blowing period of the gas to the pellet surface.

Further, in the present invention, the reduced iron pellets reduced in the moving hearth type heating furnace and discharged out of the furnace are once stored in a reservoir, and a methane or methane-containing gas is blown into the reservoir in a state where the surface temperature of the pellet is at 850° C. or higher, thereby promoting reduction of the surface layer of the pellets and preventing re-oxidation of the surface layer of the pellets at high temperature. As described previously, the iron oxide at the surface layer of the pellets is left unreduced when the combustion gas is oxidative, and the surface layer is re-oxidized in the reservoir at high temperature. Re-oxidation in the reservoir can be prevented by providing an inert atmosphere such as a nitrogen atmosphere. However, for reducing the iron oxide at surface layer of the pellets, it is necessary to blow a reducing gas into the reservoir at high temperature. Therefore, it is preferred to blow a methane or methane-containing gas into the reservoir at the pellet temperature of 850° C. or higher.

Figure 4:
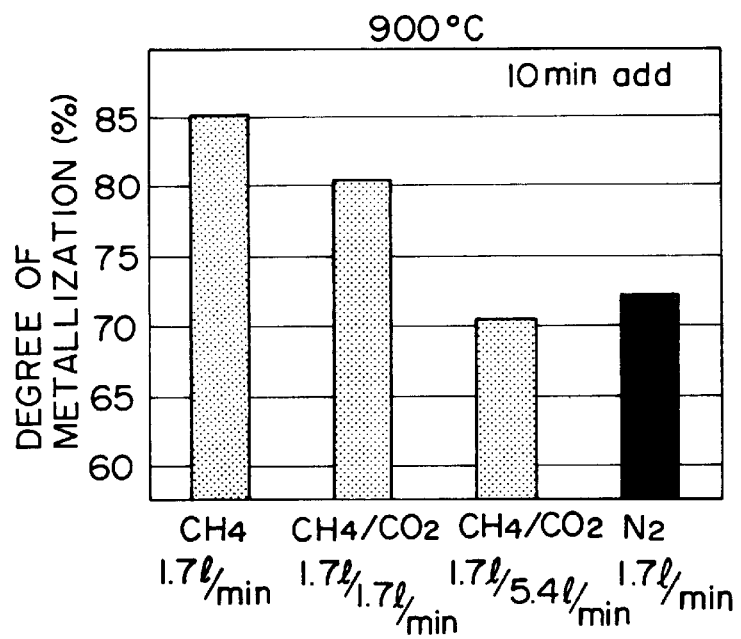
FIG. 4 is a graph illustrating the degree of metallization when 500 g of reduced iron agglomerate of 17 mm diameter is kept at 900° C. and blowing methane at 1.7 l/min, methane and $CO_2$ at 1.7/1.7 l/min, methane and $CO_2$ at 1.7/5.4 l/min and $N_2$ at 1.7 l/min ratio respectively.

A methane or methane-containing gas is decomposed non-catalytically at a temperature of 1100° C. or higher. If metallic iron is present, the metallic iron acts as a catalyst to decompose and reform the methane or methane-containing gas into $H_2$ and CO at a temperature higher than 850° C. That is, most of methane is decomposed as: $CH_4 \rightarrow C+2H_2$ and a portion thereof reacts with $H_2O$ formed by reducing reaction as: $CH_4+H_2O \rightarrow CO+3H_2$ and, further, reacts with $CO_2$ to take place a decomposing reaction of $CH_4+CO_2 \rightarrow 2CO+2H_2$. Then, $H_2$ and CO reduce the iron oxide at the surface layer of the pellets. Accordingly, the temperature of the reduced iron pellets discharged from a tunnel furnace with a moving hearth and stored in the reservoir is from 900 to 1000° C. or higher, and the iron oxide on the surface layer of the pellets can be reduced effectively by blowing the methane or methane-containing gas at that temperature. FIG. 4 shows the effect of blowing the methane into reservoir, which shows the degree of metallization when 500 g of reduced iron pellets each of 17 mm diameter are kept at 900° C., and blowing methane at 1.7 l/min, methane and $CO_2$ at 1.7/1.7 l/min, methane and $CO_2$ at 1.7/5.4 l/min and $N_2$ at 1.7 l/min respectively. Blowing of $N_2$ at a ratio of 1.7 l/min for 10 min is conducted for preventing re-oxidation of the surface layer of the pellets. Compared with the degree of metallization in this case, it can be seen that the iron oxide on the surface layer of the pellets is reduced to improve the degree of metallization as the blowing amount of methane increases.

Figure 10:
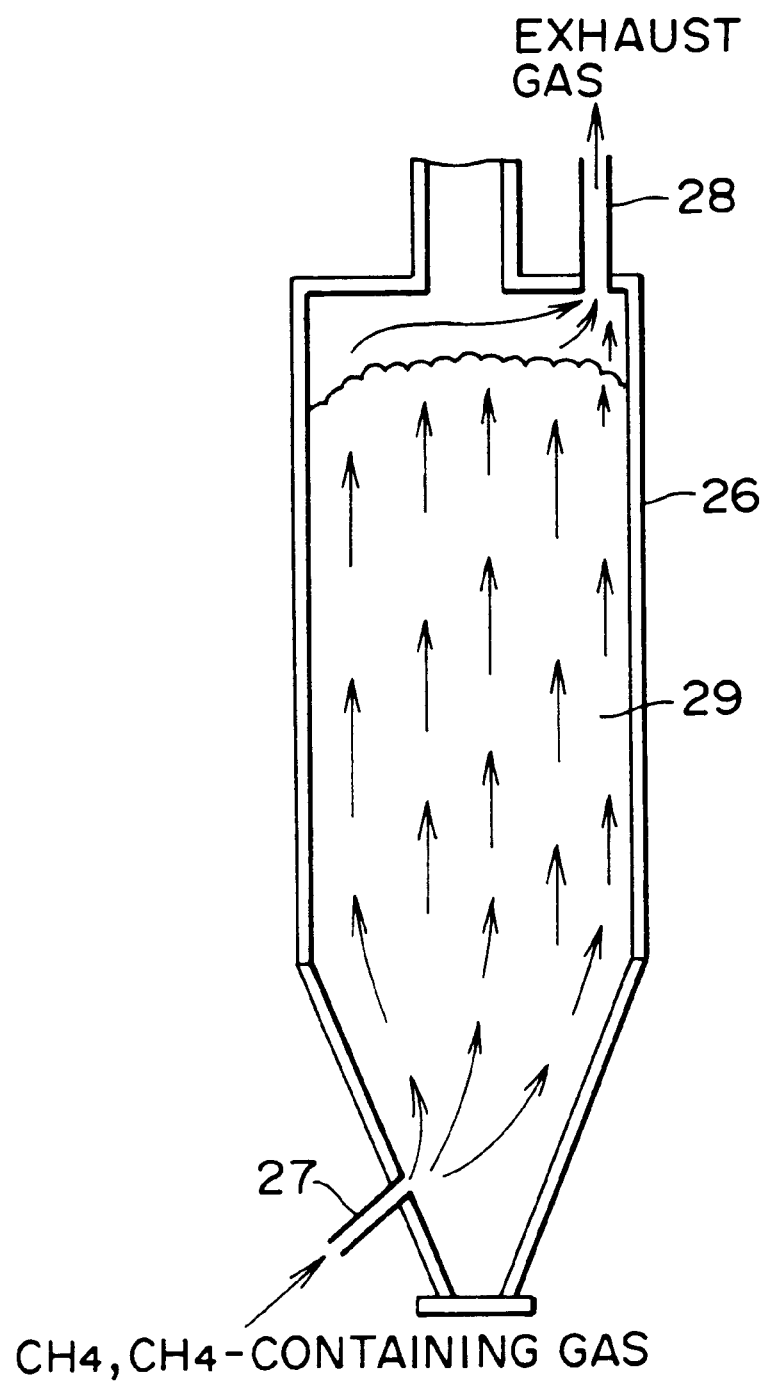
FIG. 10 is a view illustrating an example of blowing methane or methane-containing gas into a reservoir in an actual operation.

In actual operation, as shown, for example, in FIG. 10, a blowing port 27 is disposed to a lower portion and an exhaust gas port 28 is disposed to an upper portion of a reservoir 26. A methane or methane-containing gas is blown from the blowing port 27 and decomposed in the reservoir 26, and a gas reacted with iron oxide on the surface layer of the reduced iron pellets and an unreacted gas (including not decomposed gas) are recovered from the exhaust gas port 28. Arrows in the drawing schematically show the flow of the blowing gas. As will be described below, the thus recovered gas is utilized as a fuel or a methane or methane-containing gas to be blown on the surface of iron oxide pellets incorporated with carbonaceous material during movement in the final stage of reduction. Further, for the gas blown from the blowing port 27, a methane or methane-containing gas is blown in an amount corresponding to the amount of the reduced iron pellets 29 in the reservoir, with reference to the value shown in FIG. 4.

Further, the reacted exhaust gas and unreacted exhaust gas recovered from the inside of the reservoir are utilized as a fuel or a methane or methane-containing gas to be blown to the surface of iron oxide pellets incorporated with carbonaceous material during movement in the final stage of reduction. A portion of the gas blown into the reservoir is decomposed and, further, a portion of the decomposed gas reacts with the iron oxide in the surface layer of the reduced iron pellets. That is, about 20% by volume or more of the blowing gas reacts with the iron oxide in the surface layer of the reduced iron pellets and the remaining portion is the unreacted gas (including undecomposed gas). Accordingly, the exhaust gas recovered from the inside of the reservoir can be utilized effectively as the fuel or the methane or methane-containing gas to be blown to the surface of the iron oxide pellet incorporated with carbonaceous material during movement in the final stage of the reaction. Further, this enables to recover a sensible heat of the reduced iron pellets in the reservoir and effectively utilize the heat for the heating of the iron oxide pellets incorporated with carbonaceous material.

According to the present invention, reduced iron pellets having a high degree of metallization of 90% or higher can be produced by reducing the iron oxide pellets incorporated with carbonaceous material by using a moving hearth type heating furnace.

While the invention has been described in detail and with reference to specific embodiments thereof, it will be apparent to one skilled in the art that various changes and modifications can be made therein without departing from the spirit and the scope thereof.

The entire disclosure of the Japanese Patent Application No. 10-74443 filed on Mar. 23, 1998 including specification, claim drawings and summary are incorporated herein by reference in its entirety.

We claim:

1. A method of producing reduced iron agglomerates, comprising:
   a) charging agglomerates comprising iron oxide and a carbonaceous material onto the moving hearth of a moving hearth furnace;
   b) reducing the agglomerates;
   c) blowing methane or methane-containing gas over the surface of the agglomerates at a surface temperature of 1150° C. or higher for at least the final 1/18 to 1/3 of the retention time of the agglomerates in the heating furnace; and
   d) cooling the reduced iron agglomerates by blowing the methane or methane-containing gas in an amount of less than 6.0 kg mol per ton of the reduced iron agglomerates to the surface of the reduced iron agglomerates.

2. The method of producing reduced iron agglomerates as defined in claim 1, wherein said cooling step d) is effected after completion of reduction.

3. The method of producing reduced iron agglomerates as defined in claim 1, wherein said carbonaceous material comprises coal, coke, charcoal or carbon-containing blast furnace dust.

4. The method of producing reduced iron agglomerates as defined in claim 1, wherein said carbonaceous material is present with said iron oxide in an amount of from 10 to 30 mass % based on the total mass.

5. The method for producing reduced iron agglomerates as defined in claim 1, wherein step c) is conducted at an agglomerates surface temperature of 1200° C. or higher.

6. The method of producing reduced iron agglomerates as defined in claim 1, wherein in step c), said methane or methane-containing gas in blown for at least the final 1/3 of the entire retention time in the furnace at a degree of reduction of 0.55.

7. The method of producing reduced iron agglomerates as defined in claim 1, wherein in step c), said methane or methane-containing gas is blown for at least the final 1/9 of the entire retention time in the furnace at a degree of reduction of 0.7.

8. The method of producing reduced iron agglomerates as defined in claim 1, wherein in step c), said methane or methane-containing gas is blown for at least the final 1/18 of the entire retention time in the furnace at a degree of reduction of 1.

9. The method of producing reduced iron agglomerates as defined in claim 1, which further comprises, after step c) and before step d):
 i) discharging the reduced iron agglomerates reduced in the moving hearth type heating furnace out of the heating furnace; and
 ii) storing the reduced iron agglomerates discharged from the heating furnace in a reservoir.

10. The method of producing reduced iron agglomerates as defined in claim 9, wherein exhaust gas from inside of the reservoir is used either as a fuel or as said methane or methane-containing gas to be blown to the surface of the reduced iron agglomerates.

11. The method of producing reduced iron agglomerates as defined in claim 1, wherein said reduced iron agglomerates have a degree of metallization of at least 90%.

12. The method of producing reduced iron agglomerates as defined in claim 11, wherein said reduced iron agglomerates have a degree of metallization of more than 95%.

13. The method of producing reduced iron agglomerates as defined in claim 1, wherein the methane or methane-containing gas is blown over the surface of the agglomerates for at least the final 1/18 to 1/9 period of the retention time of the agglomerates in the heating furnace when the degree of reduction after mixing and decomposition of the methane or methane-containing gas blown to the surface of the agglomerates and a combustion gas in the heating furnace is 0.7 or more.

14. The method of producing reduced iron agglomerates as defined in claim 1, wherein the methane or methane-containing gas is blown over the surface of the agglomerates at least the final 1/18 to 1/3 period of the retention time of the agglomerates in the heating furnace when the degree of reduction after mixing and decomposition of the methane or methane-containing gas blown to the surface of the agglomerates and a combustion gas in the heating furnace is 0.55 or more.

15. The method of producing reduced iron agglomerates as defined in claim 1, wherein the methane or methane-containing gas is blown over the surface of the agglomerates for at least the final 1/9 period of retention time of the agglomerates in the heating furnace when only the methane or methane-containing gas is blown to the surface of the agglomerates.

16. The method of producing reduced iron agglomerates as defined in claim 1, wherein the methane or methane-containing gas is blown for at least longest 1/9 period of the stagnation period of the heating furnace at the longest.

* * * * *